2,936,375
RADIOACTIVITY BORE HOLE LOGGING

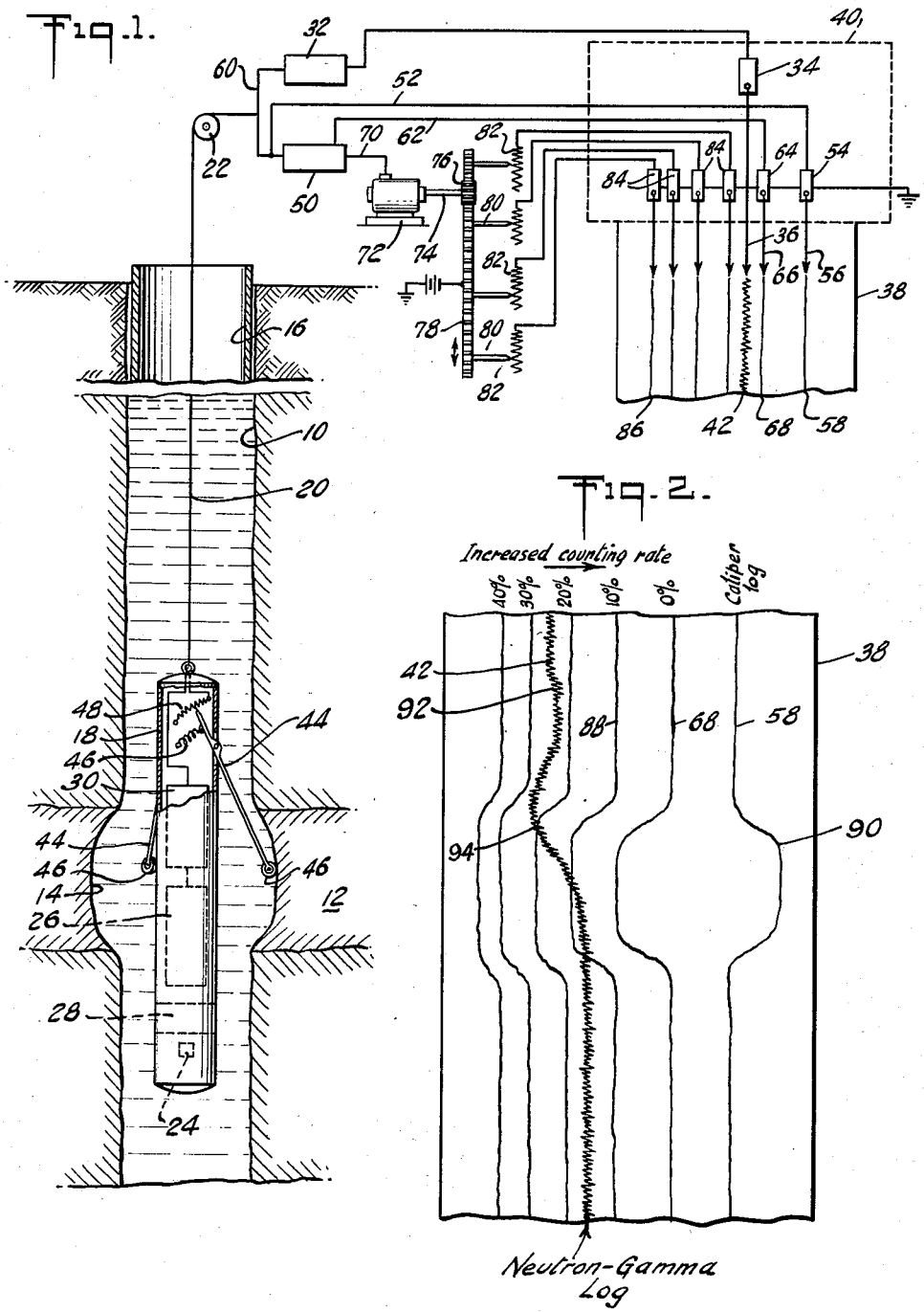

Alexander S. McKay, Bellaire, Tex., assignor to Texaco Inc., a corporation of Delaware Application December 27, 1955, Serial No. 555,593

10 Claims. (Cl. 250—83.3)

This invention relates to the logging of well bore holes to determine the characteristics of subsurface formations traversed thereby and more particularly to a method of making an induced gamma ray log which will provide a true record of the porosity, i.e., hydrogen content of the formations traversed by the bore hole. The principal object of the invention is the provision of a method of this type, in the carrying out of which the detrimental effects of variations in the bore hole size or diameter can be eliminated. By eliminating these effects it is possible to obtain a measurement of the absolute porosities of the formations surrounding the hole.

As is well known by those familiar with the art of bore hole logging a neutron-induced gamma ray log or as it is sometimes called, a neutron-gamma log, is frequently used to determine the porosities of the subsurface formations and thus the likelihood that one or more of the formations traversed by the bore hole may produce a hydrogen-containing fluid such as water or oil. It is, of course, difficult to determine from such a log whether the fluid in such a formation is oil or water but these logs are nevertheless extremely useful in locating fluid producing zones or formations and for eliminating from further consideration the other formations from which no fluid can be produced.

In making a neutron-gamma ray log a source of neutrons disposed in a sealed instrument housing together with a gamma ray detector is passed through the bore hole while suspended from a conductor cable. Neutrons from the source penetrate the surrounding formations and these neutrons in striking the atoms of the formation material may cause gamma rays to be ejected, some of these ejected or induced gamma rays traveling in such a direction that they will strike the detector disposed near the neutron source. The intensity or number of these induced gamma rays will depend largely on whether or not the formation being bombarded contains hydrogen. The hydrogen in the form of water, oil or gas may be present in the pores of the formations whereas if the formation being bombarded is substantially impervious there will be little or no hydrogen present therein. Thus, if the instrument is passing through a porous formation containing a hydrogenous fluid, depending upon the spacing between the source and detector there will be a greater or lesser number of induced gamma rays striking the detector. The detector output is amplified and usually recorded on a moving strip or record in the form of a log showing the intensity of the detected induced gamma rays in correlation with the depth of the instrument in the bore hole.

Substantially all bore holes contain fluid, either drilling mud, oil, water or gas or a mixture of these and since these fluids all contain hydrogen many of the neutrons from the source will cause gamma rays to be emitted in the surrounding hydrogen-containing fluid and these will be detected along with the gamma rays induced in the formations themselves. If the walls of a bore hole were straight, i.e., if the bore hole were of uniform diameter, the effect of the gamma rays induced in the bore hole fluid could be ascertained and subtracted from the log or since the amount of hydrogen-containing fluid in the bore hole surrounding the detector would be uniform throughout the hole its effect could be compensated for in any suitable manner. However, since well bore holes traverse many different subsurface layers of different hardness and other characteristics the walls of the bore hole are seldom, if ever, uniformly straight. Thus, in drilling the bore hole through a relatively soft formation the formation material may be washed away or it may slough off subsequently thus resulting in an enlargement of the hole. Since the hole at this point or depth will be abnormally large in diameter there will be more of the hydrogen containing fluid around the measuring instrument at that depth and a considerably greater number of the detected and measured induced gamma rays will have originated in the bore hole fluid than in the case where the hole is of smaller diameter. As stated hereinabove, it is the purpose of this invention to minimize or eliminate the effect of variations in bore hole size on a neutron-gamma ray log.

In my copending application Serial No. 279,022, filed March 28, 1952, now Patent No. 2,761,977, issued September 4, 1956 there is a disclosure of a method of making simultaneously a neutron-gamma ray log and a caliper log, i.e., a log showing variations in the diameter of the bore hole. In accordance with that method, after the two logs are made reference can be had to certain curves and other known data to obtain a more accurate measure of the porosity or hydrogen content of the formations than could be made theretofore. In other words the operator with the neutron-gamma log and the caliper log at hand can correct the neutron-gamma log for bore hole diameter to provide a more accurate porosity log. The present invention is, in effect, a method for facilitating the log interpretation by automatically and continuously re-calibrating the instrument as dictated by the findings of the bore hole caliper. Again, in the present invention the neutron-gamma log is recorded directly without any attempt to distort the log or to correct it for bore hole size variations and the graph paper or record strip itself is, in effect, distorted so that a reading taken from the neutron-gamma curve at any point will indicate the true porosity or hydrogen content of the surrounding formations at any point and without the detrimental effect of the bore hole fluid surrounding the instrument. In carrying out the invention this is accomplished by recording reference lines directly on the record strip and along with the neutron-gamma ray curve, these reference lines covering the range of porosity from 0 to say 40% and the reference lines being related to the bore hole diameter which is simultaneously determined by the caliper log.

For a better understanding of the invention reference may be had to the accompanying drawing in which:

Fig. 1 is a vertical sectional elevation through a portion of a bore hole showing an instrument suspended therein and other apparatus for carrying out this invention; and Fig. 2 is a section or portion of a record showing conditions typical of a section of a bore hole which contains an enlarged portion.

Referring to the drawing, a bore hole 10 is shown as traversing several subsurface formations including the one indicated at 12 in which the walls of the hole have sloughed off to form the enlargement 14. The upper portion of the bore hole is shown as provided with a casing 16 although this is not important to the invention. Shown as suspended within the hole 10 is a logging instrument indicated generally by the elongated housing 18 attached to the lower end of a conductor cable 20, The cable 20 at the surface passes over a suitable measuring reel or drum 22 which, in any well-known manner, provides an indication or record of the amount of cable payed out and thus the depth of the instrument 18 in the bore hole at any time.

Shown as within and near the bottom of the instrument housing 18 is a source 24 of primary radiation such as neutrons and also within the housing and above the source is a detector 26 of secondary radiation such as gamma rays which may be induced in the surrounding formations due to bombardment thereby by the neutrons from the source 24. Mounted between the source 24 and detector 26 is a direct radiation shield 28 for preventing primary radiation from the source from passing upwardly to strike the detector 26. As is well known such a shield may comprise one or more layers of a suitable radiation absorbing substance, e.g., lead or tungsten in the case of gamma rays and paraffin and cadmium in the case of neutrons. In the case where the source 24 emits both neutrons and gamma rays the shield 28 may comprise a lower layer of paraffin or some other substance for slowing down the neutrons from the source, an intermediate layer of cadmium for absorbing the slowed neutrons and an upper layer of lead or tungsten for absorbing gamma rays from the source. The output from the detector 26 is shown as passing to a suitable preamplifier and power supply 30 which is connected in turn to the conductor cable 20. At the surface the output of the preamplifier 30 is conducted from the cable to an amplifier 32, the output of which passes to a galvanometer or the like, shown schematically at 34. Extending from the galvanometer 34 is a pen arm 36 adapted to engage a moving record strip 38 of the recorder 40.

With the apparatus thus far described, when the instrument 18 is lowered or raised through the bore hole 10 neutrons from the source 24 pass outwardly to bombard the material surrounding the instrument, such material including the well fluid in the hole and the surrounding formations such as the one indicated at 12. By nuclear reaction with the atoms of the surrounding materials gamma rays may be induced, some of these traveling in a direction such as to strike the detector 26 in the bore hole. If the detector is of the electrical pulse producing, gas amplification or counter type, pulses are produced therein by the gamma rays and these pulses are preamplified at 30, passed over the cable 20, again amplified and usually integrated in the device 32 to provide a varying direct current potential to the galvanometer 34. The pen arm 36 records on strip 38 a curve 42 indicating the output of the detector 26. As has been pointed out hereinabove, the number of induced gamma rays striking the detector 26 and thus the detector output will depend upon the hydrogen content of the material surrounding the source and detector and the detector output will, depending upon the spacing between the detector and source, increase or decrease with greater or lesser amounts of hydrogen in the pores of the earth formations and also with the amount of hydrogen containing fluid surrounding the instrument in the bore hole. Thus, if there were no hydrogen-containing fluid at all in the bore holes the curve 42 would indicate only the hydrogen content of the formations and thus their porosities, but a bore hole with no fluid therein is seldom if ever encountered. Again, if the walls of the hole were uniformly straight with no cavities or enlarged portions, the effect of the hydrogen-containing fluid around the instrument would be uniform throughout the hole and could easily be disregarded or compensated for. However, since there is almost always fluid in the bore hole and since the walls of the hole are not uniformly straight but usually contain enlargement such as is indicated at 14 this effect of the varying amounts of hydrogen-containing fluid around the instrument should not be disregarded or a poor or incorrect log will result. In order to overcome this trouble the apparatus to be described has been provided.

Pivotally attached to the wall of the instrument housing 18 are one or preferably three or more arms 44 each arm having at its outer end a small feeler or wheel 46. The upper end of the arm 44 is shown as extending within the housing 18 and a small tension spring 46 attached to the upper end of the arm and with its outer end affixed to the housing serves to bias the arm so that its lower end will engage the formation walls. The upper end of the arm 44 is shown as contacting an electrical resistance element 48, its position along the element depending upon the position of the arm and thus the diameter of the bore hole. The resistor 48 is shown as connected through the cable 20 to an amplifier 50 and also through the connector 52 to another galvanometer 54 having a pen arm 56. Movements of the arm 44 caused by variations in the size of the bore hole cause more or less of the resistance 48 to be connected in circuit with the galvanometer 54, and as the instrument 18 moves through the bore hole in correlation with the movement of the record strip 38 the pen arm 56 will produce a curve 58 on the strip which will constitute a "caliper log," i.e., a record of the variations in the bore hole size. The caliper curve 58 is also shown on the enlarged section of the record strip 38 in Fig. 2 as well as the induced gamma ray curve or log 42. A bore hole calipering apparatus somewhat similar to that described above is disclosed in the U.S. Letters Patent No. 2,369,672, granted February 20, 1945, D. G. C. Hare.

In order to facilitate the proper interpretation of the induced gamma ray log a plurality of reference lines or curves covering the range of earth porosities from 0% to 40%, which lines are related to the bore hole diameter, are recorded on the record strip 38 along with the neutron-gamma ray curve 42 and the caliper curve 58. The proper position of the reference lines as a function of porosity or hydrogen content and bore hole diameter can be determined by passing the logging instrument through a bore hole in which these characteristics are known. As one means of providing and recording the reference lines one form of apparatus is illustrated schematically in Fig. 1 and is described below.

The movement of the caliper arm or arms 44 will provide at the surface through the cable connection 60 a varying voltage which can then be modified in any suitable manner such as by a non-linear electronic circuit or by a suitable motor system controlling a plurality of variable resistors in such a way that the reference lines will appear on the record strip in their proper positions. Thus the varying voltage from the caliper tool is passed to the amplifier 50 where it may be amplified, if desired, and passed over a connector 62 to a galvanometer 64, the pen arm 66 of which will trace on the strip 38 a curve 68 showing the variation in counting rate or detector output with variations in bore hole diameter for the case where there is 0% porosity or hydrogen content in the material surrounding the logging instrument.

The output of the amplifier 50 is also passed through a connector 70 to a suitable motor device 72 such as the servo mechanism of a recording potentiometer. The shaft 74 of the motor device 72 causes a small pinion 76 to rotate slightly in a clockwise or counter-clockwise direction depending upon the output of the amplifier 50 and thus the variations in the size of the bore hole and the pinion 76 engages a toothed rack 78 which will move correspondingly along its longitudinal axis. Affixed to the rack 78 are a plurality of pointers or contact members 80 each member being adapted to make contact with a respective electrical resistor 82. Each resistor 82 is connected to a different galvanometer 84 and each galvanometer has a pen arm for producing a trace or curve such as 86 on the record strip 38. The resistors 82 are preferably non-linear for several reasons. For example, with a small diameter bore hole and thus a low amount of hydrogen in the surrounding fluid then the addition of a certain amount of hydrogen around the instrument provides a much larger difference in counting rate than in the case with a larger diameter hole with a correspondingly greater amount of the hydrogen-containing fluid around the instrument. The resistors 82 are selected so that their characteristics will be in accordance with the results of the above-mentioned tests of the instrument in a bore hole where the bore hole diameter and hydrogen content of the surrounding fluid has been ascertained. Thus the upper resistor 82 will have a value such that the galvanometer 84 to which it is connected will provide a reference line 88 on the record strip 38 to indicate 10% porosity and the other resistors 82 will be correspondingly selected so that their galvanometers will provide reference lines indicating 20%, 30% and 40% porosity as shown in Fig. 2.

With reference to Fig. 2, the enlarged portion 14 of the bore hole is indicated by the hump 90 in the caliper log 58 and the reference lines 68, 88, etc. will indicate their respective porosities for the hole having the enlargement 14. The neutron-gamma curve 42 is, in effect, superimposed on the reference lines and the porosity or hydrogen content of the formations is measured at any depth by noting the position of the curve 42 with respect to the reference lines. Thus, by interpolation at the depth indicated at, say 92, the porosity or hydrogen content would be indicated as about 25%. Again, at the depth or point 94 where the neutron-gamma curve crosses the reference line indicating 20% porosity, the porosity would be shown to be exactly 20%.

Although with the arrangement shown in the drawing the instrument 18 would travel substantially along the longitudinal axis of the bore hole since the arms would center the instrument therein, in some instances where a large diameter hole is to be logged or where large wall cavities or enlargements are to be expected it may be better to maintain the logging instrument close to or in contact with one side of the hole wall. Such an arrangement is illustrated in Fig. 2 of the aforementioned Hare Patent No. 2,369,672.

It will be noted that in Fig. 1 of the drawing the feeler 46 engages the bore hole wall at a point above the source 24 and detector 26. Again this is for sake of clarity in illustration. It is to be understood that for practical reasons the feeler 46 should be mounted so that it will engage the formation walls at a point substantially midway between the source 24 and the detector 26. However, the apparatus as illustrated in Fig. 1 can also be used by providing any suitable means at the surface for slightly retarding the recording of the caliper log 58 and the curves 68, 88, etc. on the record strip as compared to the neutron-gamma ray curve 42 while the instrument is moving upwardly through the hole. In such a manner, even when the calipering instrument is not horizontally opposite the source and detector the several curves can be positioned laterally opposite each other for ease in interpretation as is the case in the showing of Fig. 2.

It is also to be understood that it is not essential that all of the curves or reference lines be recorded simultaneously. Thus, the logging instrument could be passed through the hole two different times, the neutron-gamma ray log being made at one time and the caliper log and reference lines the other time, it merely being necessary that the neutron-gamma curve be superimposed on the reference lines, or vice versa, as indicated in Fig. 2.

While the invention has been described with relation to the making of an induced gamma ray log, it is to be understood that the same principles will apply where certain other logs are made such as a scattered neutron log or a scattered gamma ray log. In the first case, the detector 26 would be a neutron detector and in the second case the source 24 would be a source of gamma rays rather than neutrons.

Obviously, many modifications and variations of the invention as hereinbefore set forth may be made without departing from the spirit and scope thereof and therefore only such limitations should be imposed as are indicated in the appended claims.

I claim:

1. The method of making an improved induced gamma ray log to determine the hydrogen content of earth formations traversed by a bore hole which comprises passing through the hole a source of neutrons so as to bombard said formations thereby and induce gamma rays therein, detecting the intensity of said induced gamma rays in a zone in the hole near said source, recording on a moving strip a curve of the intensity of the detected induced gamma rays in correlation with depth in the hole, simultaneously varying a voltage in accordance with variations in the diameter of said bore hole opposite said zone, simultaneously recording on said strip in correlation with depth in the hole a plurality of reference curves each corresponding to a different value of said varying voltage and thus to different values of the hydrogen content in the material surrounding said source, in order to provide a record with the induced gamma ray curve plotted in correlation with corrected reference curves.

2. The method described in claim 1 with the additional steps of recording on said record strip a caliper curve produced by said varying voltage, said curve being positioned on said strip laterally opposite said induced gamma ray curve and said reference lines so that points on said curves and lines laterally opposite each other will represent the same depth in the bore hole.

3. The method of making an improved induced gamma ray log to determine the hydrogen content of earth formations traversed by a bore hole which comprises bombarding the formations with neutrons from a source passing through the hole so as to induce gamma rays in the formations, detecting the intensity of said induced gamma rays in a measuring zone in the hole near said source, recording on a moving record strip a curve of the intensity of the detected induced gamma rays in correlation with depth in the hole, simultaneously varying a voltage in accordance with variations in the diameter of said bore hole opposite said zone, simultaneously recording on said strip in correlation with depth in the hole a plurality of reference curves each corresponding to a different value of said varying voltage and thus to a different percentage of the hydrogen content of the bore hole fluid surrounding said detecting zone, in order to provide a record with the induced gamma ray curve plotted in correlation with corrected reference curves.

4. The method described in claim 3 with the additional steps of recording on said record strip a caliper curve produced by said varying voltage, said curve being positioned on said strip laterally opposite said induced gamma ray curve and said reference lines so that points on said curves and lines laterally opposite each other will represent the same depth in the bore hole.

5. The method of making an improved radioactivity log to determine a characteristic of earth formations traversed by a bore hole which comprises passing through the hole a source of primary radiation so as to bombard said formations thereby and induce secondary radiation therein, detecting the intensity of said secondary radiation in a zone in the hole near said source, recording on a moving strip a curve of the intensity of the detected secondary radiation in correlation with the bore hole depth, calipering the bore hole in substantially the same horizontal plane as said detecting zone, simultaneously recording on said strip a plurality of reference lines, each of said reference lines corresponding to a different percentage of said characteristic in the material surrounding said source, and continuously controlling the value of said reference lines as a function of the caliper measurement, in order to provide a logging record with the detected radiation curve indicative of said characteristic plotted with respect to reference lines that have been continuously corrected for the effect of variations in bore hole diameter.

6. The method of making an improved induced gamma ray log to determine the hydrogen content of earth formations traversed by a bore hole which comprises passing through the hole a source of neutrons so as to bombard said formations thereby and induce gamma rays therein, detecting the intensity of said induced gamma rays in a zone in the hole near said source, recording on a moving strip a curve of the intensity of the detected induced gamma rays in correlation with the bore hole depth, simultaneously calipering the bore hole in substantially the same horizontal plane as said detecting zone, simultaneously recording on said strip a plurality of reference lines, each of said reference lines corresponding to a different hydrogen content in the material surrounding said source, and controlling the value of said reference lines as a function of the caliper measurement, thereby providing a log indicative of said characteristic and which is recorded with respect to reference lines that have been corrected for variations in bore hole diameter.

7. The method of making an improved radioactivity well log to determine a characteristic of earth formations along the bore hole comprising the steps of passing a radiation detector through the bore hole for detecting radiation entering the bore hole from said earth formations, the intensity of the detected radiation being subject to variation as a function of variation in the diameter of the bore hole from place-to-place along the well bore, making a substantially continuous record of the intensity of the detected radiation on a record strip in correlation with the position of the detector in the bore hole, calipering the bore hole along the formations traversed by said detector, recording a plurality of reference lines on said record strip, each of said reference lines corresponding to a different percentage of the characteristic of the formation indicated by the recorded value of radiation intensity, and continuously controlling the value of said reference lines in correlation with the record of detected radiation as a function of said caliper measurement, in order to provide a logging record with the detected radiation record indicative of said characteristic recorded with respect to reference lines that have been continuously corrected for variations in bore hole diameter.

8. The method of making an improved well log to determine a characteristic of earth formations along the bore hole comprising the steps of passing a device through the bore hole for determining a quantity indicative of said characteristic, the determined quantity being subject to variation as a function of variation in the diameter of the bore hole from place-to-place along the well bore, making a substantially continuous record of the value of the determined quantity on a record strip in correlation with the position of the device in the bore hole, calipering the bore hole along the formations traversed by said device, recording on said record strip a plurality of reference lines, each of said reference lines corresponding to a different percentage of the characteristic of the formation indicated by the recorded value, and continuously controlling the value of said reference lines as a function of said caliper measurement, in order to provide a logging record with the detected radiation record indicative of said characteristic recorded with respect to reference lines that have been continuously corrected for variations in bore hole diameter.

9. The method of making an improved radioactivity well log to determine a characteristic of earth formations comprising the steps of traversing the bore hole opposite said formations with a detector of radiation entering the bore hole from said earth formations, making a substantially continuous record of the intensity of the detected radiation on a record strip in correlation with the position of the detector in the bore hole, during the same traversing step calipering the bore hole in the vicinity of said detector, simultaneously recording on said strip reference data corresponding to a predetermined value of the characteristic of the formation indicated by the recorded radiation intensity, and controlling the value of said reference data as a function of said caliper measurement, thereby providing a log indicative of said characteristic and which is recorded with respect to reference data that have been corrected for variations in bore hole diameter.

10. The method of making an improved well log to determine a characteristic of earth formations along the traverse of the bore hole, comprising the steps of traversing the bore hole opposite the formations with a device for determining a quantity indicative of said characteristic, the determined quantity being subject to variation as a function of variation in the diameter of the bore hole from place-to-place along the well bore, making a substantially continuous record of the value of the determined quantity in correlation with the position of the device in the bore hole, during the same traversing step calipering the bore hole in the vicinity of said detector, simultaneously recording on said record reference data corresponding to a predetermined value of the characteristic of the formation indicated by the recorded value and controlling the value of said reference data as a function of said caliper measurement, thereby providing a log indicative of said characteristic and which is recorded with respect to reference data that have been corrected for variations in bore hole diameter.

References Cited in the file of this patent

UNITED STATES PATENTS

| | | |
|---|---|---|
| 2,369,672 | Hare | Feb. 20, 1945 |
| 2,515,535 | Thayer et al. | July 18, 1950 |
| 2,648,012 | Scherbatskoy | Aug. 4, 1953 |
| 2,648,778 | Silverman et al. | Aug. 11, 1953 |
| 2,761,977 | McKay | Sept. 4, 1956 |